(12) United States Patent
Kaplan

(10) Patent No.: US 11,887,509 B2
(45) Date of Patent: Jan. 30, 2024

(54) METHOD AND APPARATUS FOR COMPARING COLORS

(71) Applicant: Lee Kaplan, Chicago, IL (US)

(72) Inventor: Lee Kaplan, Chicago, IL (US)

( * ) Notice: Subject to any disclaimer, the term of this patent is extended or adjusted under 35 U.S.C. 154(b) by 178 days.

(21) Appl. No.: 17/224,968

(22) Filed: Apr. 7, 2021

(65) Prior Publication Data
US 2021/0319721 A1 Oct. 14, 2021

Related U.S. Application Data

(60) Provisional application No. 63/008,316, filed on Apr. 10, 2020.

(51) Int. Cl.
| | | |
|---|---|---|
| *G09F 3/02* | (2006.01) | |
| *G01J 3/52* | (2006.01) | |
| *A45D 44/00* | (2006.01) | |

(52) U.S. Cl.
CPC ............ *G09F 3/02* (2013.01); *G01J 3/526* (2013.01); *A45D 44/005* (2013.01); *G09F 2003/0208* (2013.01); *G09F 2003/0279* (2013.01)

(58) Field of Classification Search
CPC ............ G09F 3/02; G09F 2003/0208; G09F 2003/0279; G09F 5/00; G01J 3/526; G01J 3/52; G01J 3/522; A45D 44/005; A61B 5/1034; G01N 21/293; B41M 3/005
See application file for complete search history.

(56) References Cited

U.S. PATENT DOCUMENTS

| | | | | |
|---|---|---|---|---|
| 1,741,080 | A | * 12/1929 | Stenz .................. | G09F 5/04 |
| | | | | 206/81 |
| 6,717,673 | B1 | * 4/2004 | Janssen ............... | G01J 3/46 |
| | | | | 356/402 |
| 2012/0031540 | A1 | * 2/2012 | Peltz .................. | G01J 3/52 |
| | | | | 73/866 |
| 2012/0149561 | A1 | * 6/2012 | Ribi .................. | B41M 5/30 |
| | | | | 428/32.52 |
| 2013/0242306 | A1 | * 9/2013 | Kettler ............... | G01J 3/50 |
| | | | | 356/421 |
| 2013/0302591 | A1 | * 11/2013 | Timmerman ........ | G09F 3/02 |
| | | | | 428/354 |
| 2015/0153229 | A1 | * 6/2015 | Badri ................. | G01J 3/463 |
| | | | | 356/422 |

(Continued)

FOREIGN PATENT DOCUMENTS

| | | | | |
|---|---|---|---|---|
| JP | H05107115 | A | * 4/1993 | ............ G01J 3/52 |
| JP | 10-253459 | A | 9/1998 | |

(Continued)

*Primary Examiner* — Mohamed K Amara

(74) *Attorney, Agent, or Firm* — Heimlich Law, PC; Alan Heimlich, Esq.

(57) ABSTRACT

A Method and Apparatus for Comparing Colors have been disclosed. In one implementation a compliant membrane which is substantially transparent with an area having a shade/color is placed on the user's skin to see what the shade/color will look like on the skin. In one implementation a compliant substrate which is largely transparent with an area having a shade/color is placed on an inanimate object to see how the shade/color will appear on the inanimate object without the substrate itself causing an unnecessary barrier between the inanimate object and the shade/color.

1 Claim, 21 Drawing Sheets

(56) References Cited

U.S. PATENT DOCUMENTS

| | | | | |
|---|---|---|---|---|
| 2015/0185387 A1* | 7/2015 | Amimori | ............ | B42D 25/391 |
| | | | | 156/324 |
| 2015/0235575 A1* | 8/2015 | Balogh | ................ | G09F 3/0297 |
| | | | | 40/310 |
| 2016/0316886 A1* | 11/2016 | Samain | ................ | A45D 34/042 |
| 2017/0138793 A1* | 5/2017 | Qu | .................... | G06K 15/1878 |
| 2018/0001684 A1* | 1/2018 | Mitchell, Jr. | ........ | B42D 15/085 |
| 2018/0001691 A1* | 1/2018 | Harada | ................ | G03H 1/0011 |
| 2018/0052053 A1* | 2/2018 | Atkinson | ............ | G06K 7/1417 |
| 2018/0146175 A1* | 5/2018 | Mui | .......................... | G01J 3/52 |
| 2018/0209852 A1* | 7/2018 | Mcclanahan | ............ | G01J 3/52 |

FOREIGN PATENT DOCUMENTS

| | | | | | |
|---|---|---|---|---|---|
| JP | | H10253459 A | * | 9/1998 | ................ G01J 3/52 |
| JP | | 2001-074556 A | | 3/2001 | |
| JP | | 2002191432 A | * | 7/2002 | ........... A45D 44/005 |
| JP | | 2004-301506 A | | 10/2005 | |
| JP | | 2020-000874 A | | 1/2020 | |
| KR | | 20230002565 A | * | 1/2023 | .............. G01J 3/526 |
| WO | WO 2005-072448 A2 | | | 8/2005 | |
| WO | WO-2021052793 A1 | | * | 3/2021 | ........... A45D 44/005 |

\* cited by examiner

METHOD AND APPARATUS FOR COMPARING COLORS

RELATED APPLICATION

The present application for patent is related to U.S. Patent Application No. 63/008,316 titled "Method and Apparatus for Comparing Colors" filed Apr. 10, 2020 pending by the same inventor which is hereby incorporated herein by reference.

FIELD OF THE INVENTION

The present invention pertains to comparing colors. More particularly, the present invention relates to Method and Apparatus for Comparing Colors.

BACKGROUND OF THE INVENTION

Comparing or matching colors is difficult whether it be comparing or matching colors on a skin tone, colors on hair or teeth, colors on manufactured or handcrafted items, colors on stationary or moving physical structures, colors on items found in the natural world, etc.

For example, precisely or exactly choosing or selecting or test sampling color cosmetics (including, but not limited to, lipstick, blush, foundation, concealer, eye shadow, eye and lip pencils, nail polish, hair color, sunless tanner, tooth whiteners) in hygienic, safe and/or non-committal ways to decide what color and product to purchase is difficult. Additionally, trying to prevent or reduce or minimize skin irritation caused by continually applying-then-removing colors for testing as well as needing to test lighter colors before darker colors due to staining and inaccurate color representation presents a problem.

FIG. 1, generally at 100, shows various prior approaches. At 102 is shown direct application to lips of different colors. At 104 is direct application to skin of different shades. At 106 is lipstick. At 108 is direct application to skin of different shades (@noyneungmakeup and NYX https://www.nyxcosmetics.com/). At 110 is direct application to skin of different red shades. The stock photos and advertisements are properties of their respective owners and no claim is made thereto.

FIG. 2, generally at 200, shows various prior approaches from stock photos and advertisements. At 202 is shown direct application to skin of a color (alamy stock photo from www.alamy.com). At 204 is direct application to skin of different colors. At 206 are different tones directly applied to the skin. At 208 is shown 7 colors of concealer (Focallure https://focallure.com/). At 210 is direct application to skin of different shades from Maybelline Fit Me Foundation: Medium shades (https://www.maybelline.com/). At 212 are directly applied shades to 3 different shades of arms showing the differing appearance of each cosmetic shade (Sephora app screenshot, https://www.sephora.com). The stock photos and advertisements are properties of their respective owners and no claim is made thereto.

Manually applying a coloring agent to a product/person through means of an applicator (brush, tube, sponge, etc.) and then having to remove the coloring agent if not satisfied or when placing another coloring agent atop that and thereby (a) negatively impacting the true color of coloring agent due to sub-layer colorants and/or (b) adding undesired thickness to the items being colored, thereby possibly negatively impacting functionality (i.e., not sealing/closing as intended, unable to turn, unable to attach other parts) is a problem. Also, for a human application to skin there is the unhygienic and possible allergen-inducing aspects that cause problems.

This presents a technical problem for which a technical solution using a technical means is needed.

BRIEF DESCRIPTION OF THE DRAWINGS

The invention is illustrated by way of example and not limitation in the figures of the accompanying drawings.

Any brand names or trademarks in the figures is the property of their respective owners and no claim is made thereto.

DETAILED DESCRIPTION

Figure 1:
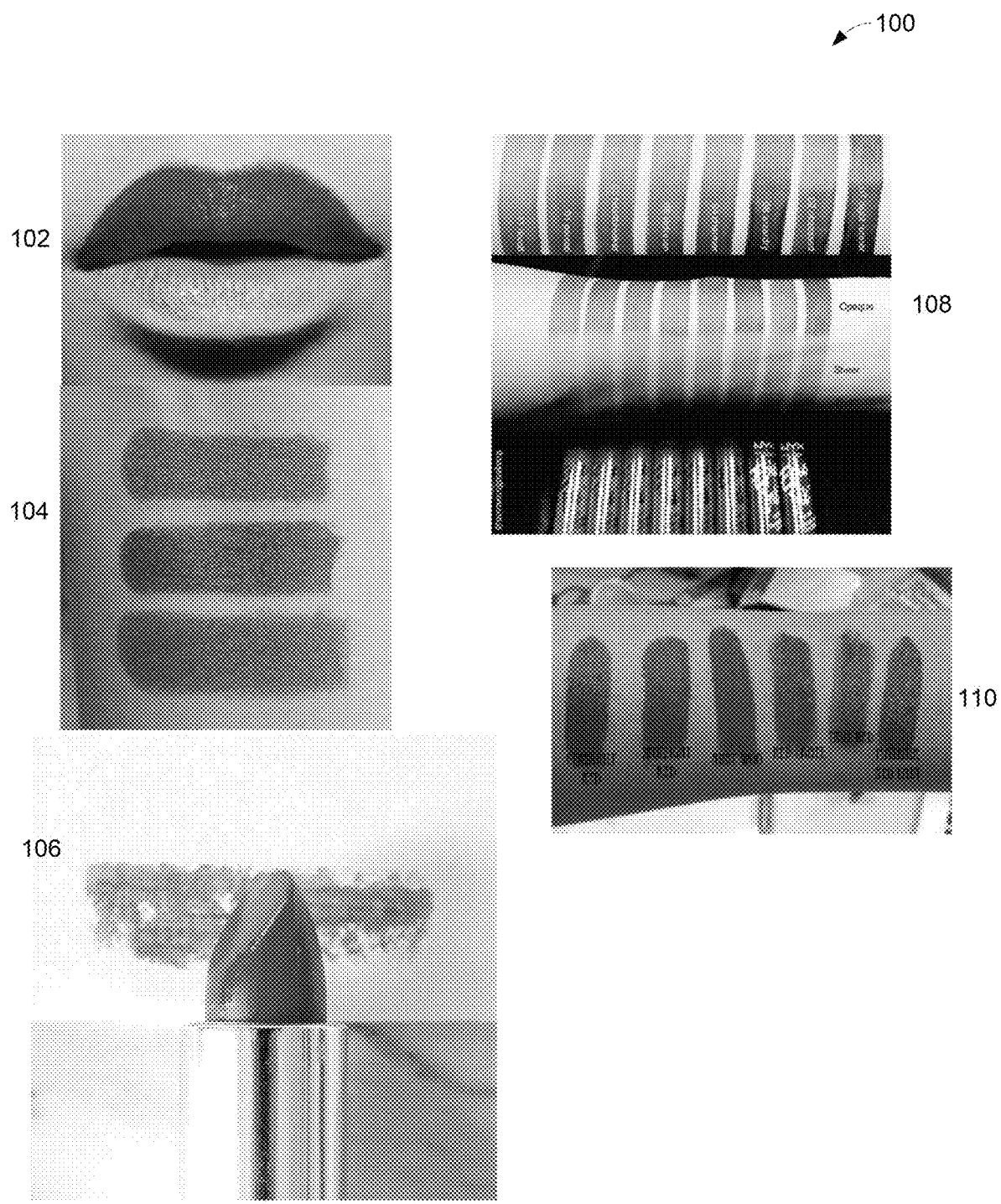
FIG. 1 shows various prior approaches.
Figure 2:
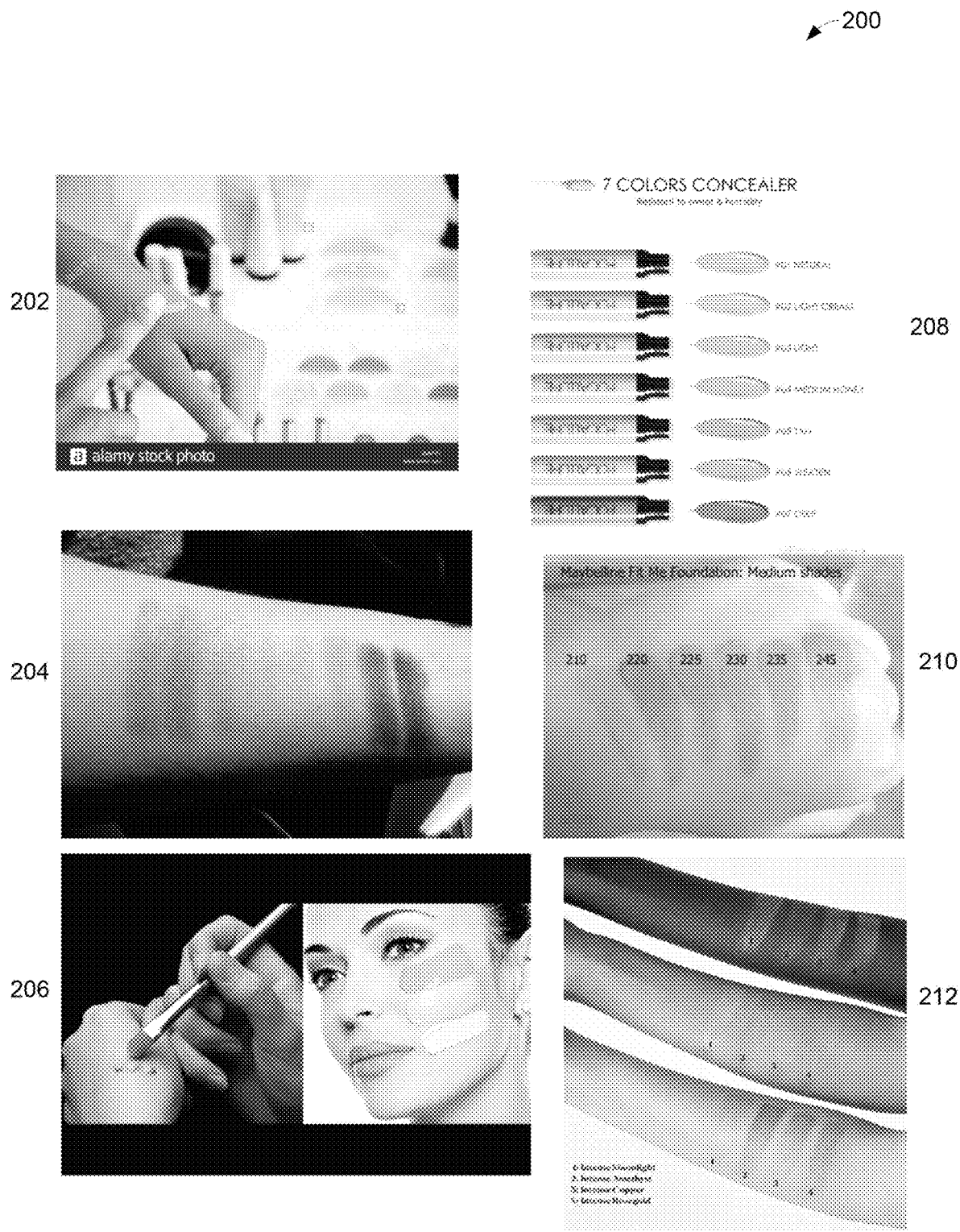
FIG. 2 shows various prior approaches.

While embodiments of the invention are illustrated primarily for a cosmetic use, the invention is not so limited and the techniques disclosed can be applied to comparing or matching other colors, for example, but not limited to shades of manufactured or handcrafted items, stationary or moving physical structures, or items found in the natural world (examples of all such as interior and exterior walls, furniture, vehicles and vessels, product enclosures, textiles, drapes etc.)

Embodiments of the techniques support comparing or matching colors by a user to determine their preference for a shade or color.

Embodiments of the techniques support a color sampling tool for animate and inanimate objects for hygiene, including but not limited to, barrier protection against viruses, bacteria, pathogens, and other health maladies, or allergen reduction, or error reduction in comparisons, or economical decision-making, or avoiding excess waste or causing environmental harm.

The techniques disclosed in various one or more embodiments (the embodiments are not mutually exclusive) helps end-users of colorization products more confidently, cost effectively, hypoallergenically, and hygienically (when applied to body parts) select and/or purchase products that meet their color needs.

The techniques disclosed in various one or more embodiments helps retailers/wholesalers/manufacturers reduce variable business costs caused by end-users returning products due to disparities between color chips/samples and the true color applied to both animate and inanimate objects. That is, by increasing the percentage of good-to-great color picks at purchase, we can lower the percentage of expensive/wasteful returns by customers on the supply chain itself due to poor-to-bad color picks.

The one or more embodiments and techniques disclosed are applicable to multiple industries that utilize colorization, including but not limited to, these sectors and sub-categories:

Cosmetics and Personal Care Products
Color cosmetics (lips, eyes, face, etc.)
Makeup
Hair dyes/coloring
Matching hair extensions
Nail varnishes/polishes
Self-tanners
Healthcare
Dental (tooth whitening, crown color, etc.)
Ophthalmology (eyeglass frames, contacts, etc.)
Orthopedics (casts, braces, etc.)
Prosthetics
Surgical (skin grafts, sutures, etc.)
Vehicles and Vessels
Airplanes, unmanned aviation vehicles (UAVs such as drones), gliders, and other manned and unmanned modes of air transport
Automobiles (non-OEM), trucks, automated vehicles, motor coaches, buses and other personal and commercial vehicles
Bicycles, scooters and other non-motorized modes of transport
Marine, freshwater and other waterborne commercial and personal transportation and hobbyist vessels
Motorcycles, all-terrain vehicles (ATVs), and other motorized/electric modes of transport
Rapid rail, light rail, subways, trolleys, trams and trains
Furnishings
Cabinetry
Furniture (new, vintage, antique) for indoor and outdoor use
Garden products (fixtures, equipment, tools, privacy screens, etc.)
Hobby use
Manufacturing
Anodizing
Appliances (small and large)
Ceramics/pottery (food-safe and decorative)—glazes, special effects post-firing, etc.
Electronics
Office furniture and fixtures
Powder coatings, paints, glazes, stains and other specialty chemicals especially those that contain chroma, hues or tints
Textile Dying and leather tanning
Construction and Interior Decorating
Architectural glass
Concrete stains and colors
Outdoor spaces (public and private)
Screening, umbrellas, awnings, window treatments, etc.
Siding
Tiles and flooring
Trims (baseboards, moldings, etc.—floor to ceiling)
Walls (interior and exterior)
Window and sliding door tints, frames, decorations, etc.

The one or more embodiments and techniques disclosed are applicable to multiple users of colorization, including but not limited to, these professions and trades:

Auto body shop
Architects/General Contractors
Artisans/Craftspeople
Artists/Illustrators/Graphic Designers/Theatrical makeup
Chemists/Researchers/Scientists
Dentists/Physicians/Surgeons/Optometrists/Opticians/Prosthetists/Orthotists
Industrial Designers/Product Designers/Product Developers
Interior Decorators
Makeup Artists/Hair Stylists/Fashion Stylists
Merchandisers/Retailers/Trade Show Booth Creators
Marketers/Package Designers/Printers
Painters
Programmers/Digital Content Creators/Virtual Reality
Publishers/Editors/Photographers
Tattoo parlors
Trend Forecasters When people desire adding color/pigment to animate or inanimate objects, their color objective is either specific whereby they need an exact match so they will keep seeking that perfect shade (e.g., "These chairs must match the living room curtains," "This wood varnish must match the whole dresser after being repaired," or "We need to repaint our inventory because customers aren't buying this line" or "We must have our signature color"); or inspirational whereby they examine numerous shades and choose the best based on any number of variables (e.g., "What's the best red lipstick or tooth whitening shade for my skin tone?" or "I want a nice green for my kitchen walls"). This is true whether the pigment will be applied to themselves or other people (such as cosmetics, personal care products and some medical/health devices) or to physical items (such as personal items in homes, items in public, commercial and industrial spaces and manufactured items).

This decision-making and buying cycle impacts not only end-users of color products but also the entire supply chain of manufacturers, wholesalers and retailers regardless of B2C (business to consumer) or B2B (business to business, commercial and industrial) channels.

In one embodiment a color is affixed to a clear or transparent or translucent substrate and placed atop the item to be colorized thereby showing the accuracy of the combined colors. The substrate can have various shades, tints, textures, and/or provide other options to assist in the desired end-result and the user can choose/purchase accordingly.

Figure 3:
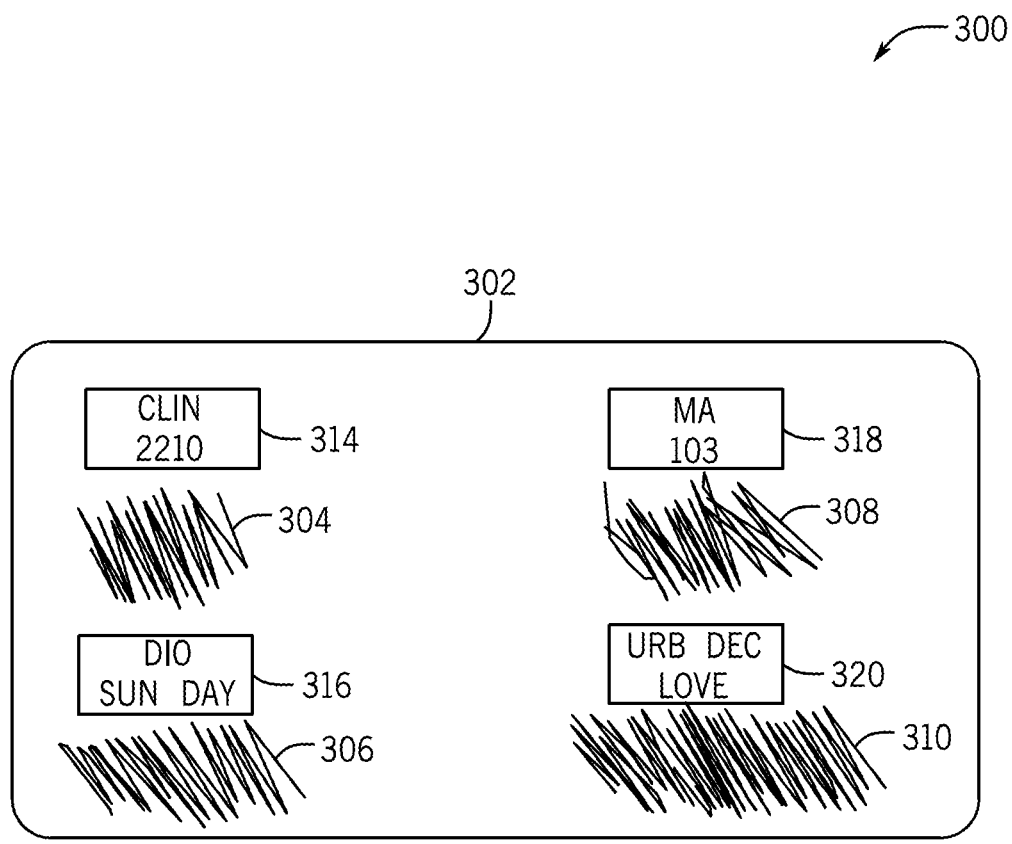
FIG. 3 illustrates a 4-color comparison device.

FIG. 3 illustrates, generally at 300, one embodiment showing a 4-color comparison device. At 302 is a rounded rectangle substrate. The rounded rectangle substrate shown has 4-color selection regions, 304, 306, 308, and 310. Each of the color selection regions has a section for writing and identifying a selection, 314, 316, 318, and 320. The section for writing and identify a selection may be directly on the substrate or may be a coated area on the substrate. The dimensions of the rounded rectangle 302 substrate can vary to fit the intended use. Not shown is any possible watermark on the comparison device.

Figure 4:
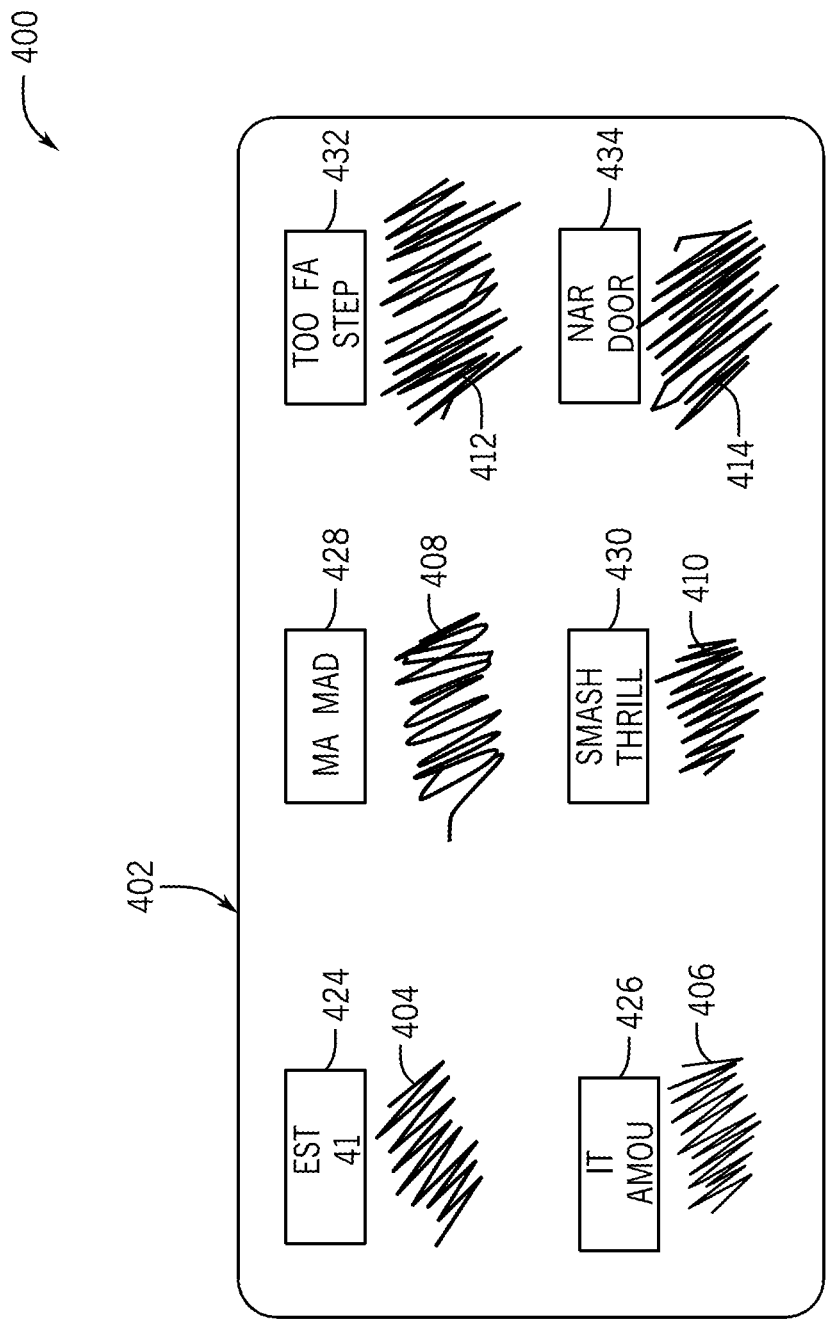
FIG. 4 illustrates a 6-color comparison device.

FIG. 4 illustrates, generally at 400, one embodiment showing a 6-color comparison device. At 402 is a rounded rectangle. The rounded rectangle shown has 6-color selection regions, 404, 406, 408, 410, 412, and 414. Each of the color selection regions has a coated section for writing and identifying a selection, 424, 426, 428, 430, 432, and 434.

The dimensions of the rounded rectangle 402 can vary to fit the intended use. Not shown is any possible watermark on the comparison device.

Figure 5:
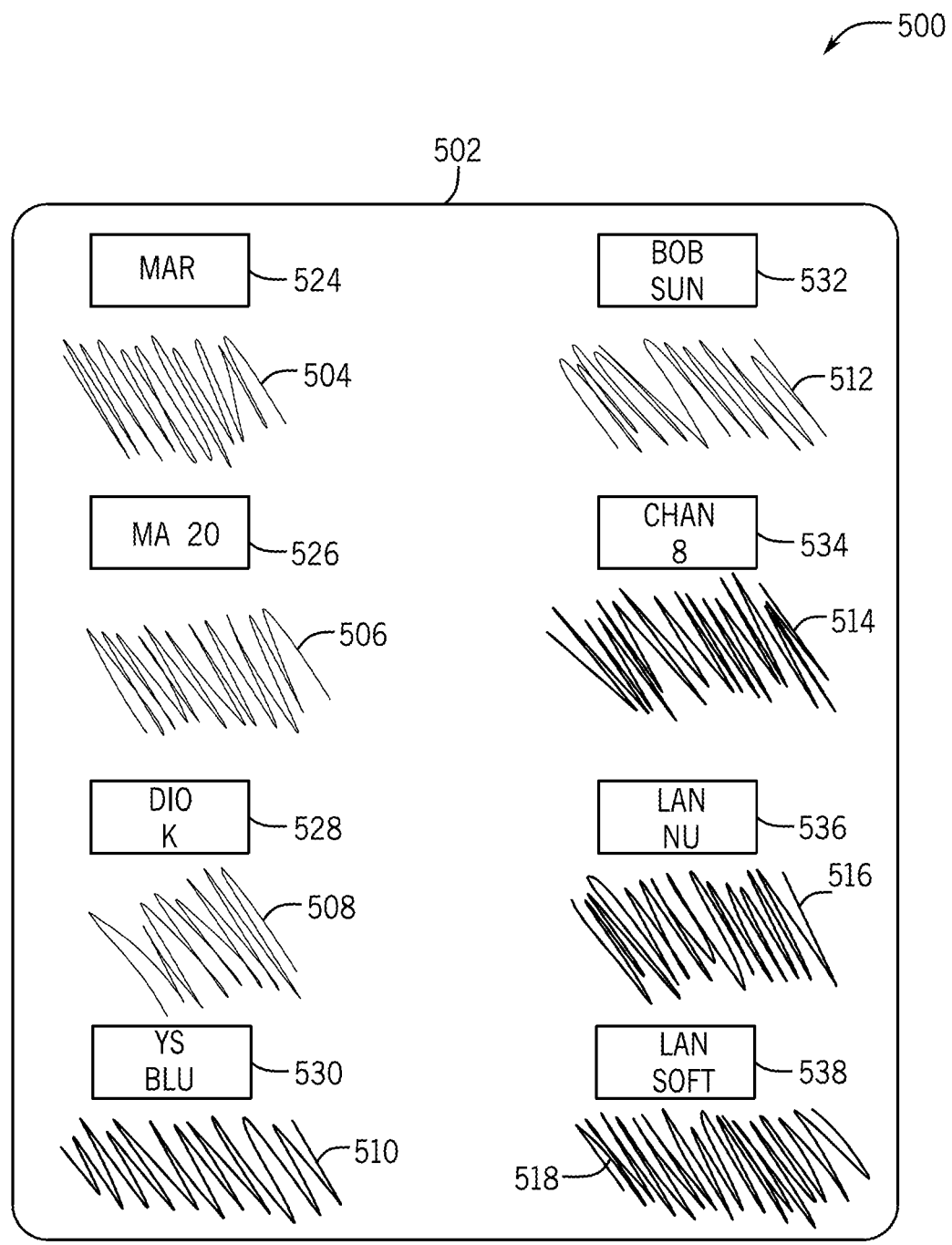
FIG. 5 illustrates an 8-color comparison device.

FIG. 5 illustrates, generally at 500, one embodiment showing an 8-color comparison device. At 502 is a rounded rectangle. The rounded rectangle shown has 8-color selection regions, 504, 506, 508, 510, 512, 514, 516, and 518. Each of the color selection regions has a coated section for writing and identifying a selection, 524, 526, 528, 530, 532, 534, 536, and 538. The dimensions of the rounded rectangle 502 can vary to fit the intended use. Not shown is any possible watermark on the comparison device.

Figure 6:
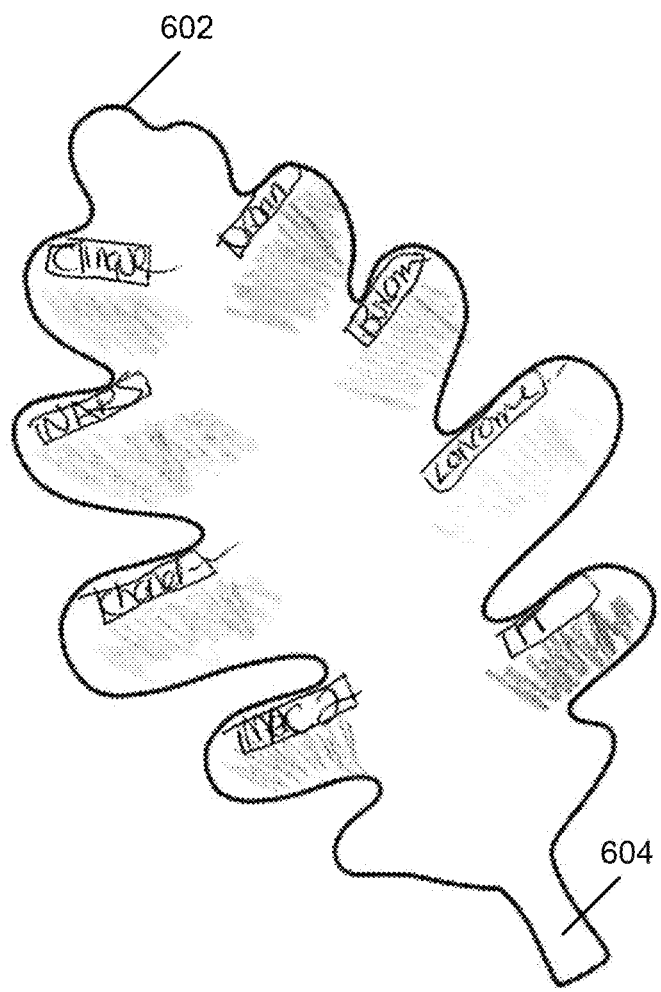
FIG. 6 illustrates a leaf-shaped comparison device.

FIG. 6 illustrates, generally at 600, one embodiment showing a leaf-shaped comparison device. At 602 is the leaf shape. The leaf shape 602 has a stem 604 that may be used as handle for the leaf shape 602. The leaves having the various colors/shades and sections for markings may be equally shaped or varied as shown. Not shown is any possible watermark on the comparison device.

Figure 7:
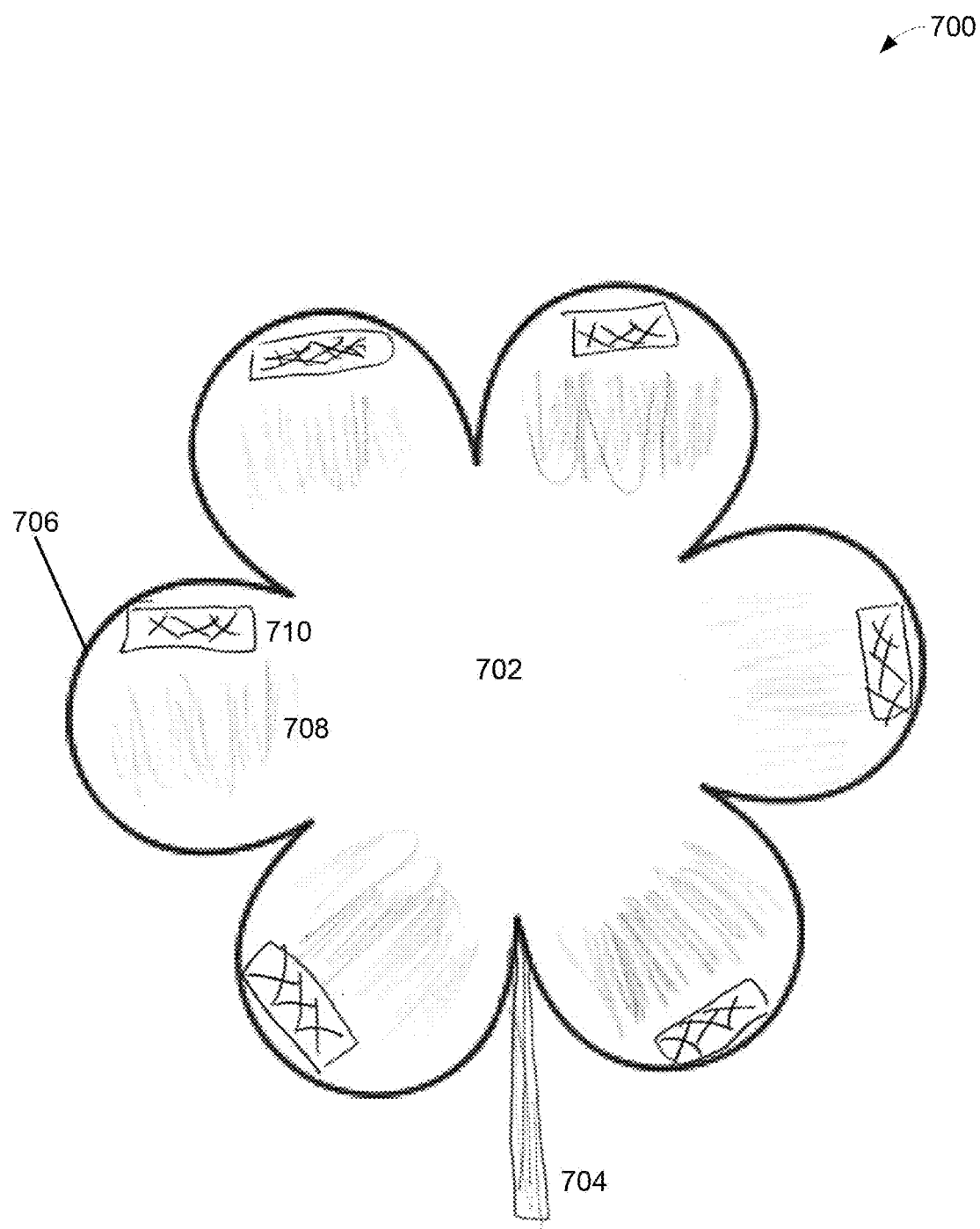
FIG. 7 illustrates a flower-shaped comparison device.

FIG. 7 illustrates, generally at 700, one embodiment showing a flower-shaped comparison device. At 702 is the flower shape. The flower shape 702 has an optional (shown) stem at 704 that may be used as a handle for the flower shape 702. The flower petals having the various colors/shades and sections for markings are shown. Petal 706, having shade/color 708, and marking/indication area 710 are representative of the 6 petals shown. Not shown is any possible watermark on the comparison device.

Figure 8:
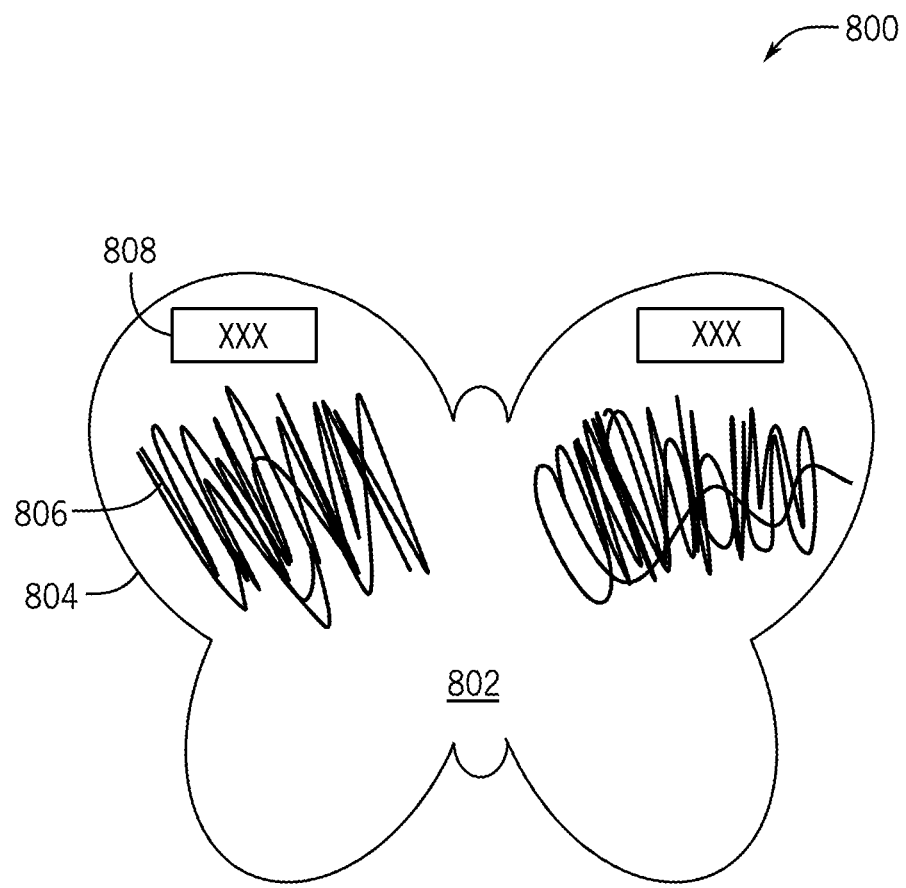
FIG. 8 illustrates a butterfly shaped comparison device.

FIG. 8 illustrates, generally at 800, one embodiment showing a butterfly shaped comparison device. At 802 is the butterfly shape. The butterfly wings having the various colors/shades and sections for markings are shown. Wing 804, having shade/color 806, and marking/indication area 808 is representative of the two wings shown. While the comparison device in FIG. 8 shows two different colors, the embodiment is not so limited and may show one or more colors/shades. Not shown is any possible watermark on the comparison device.

Figure 9:
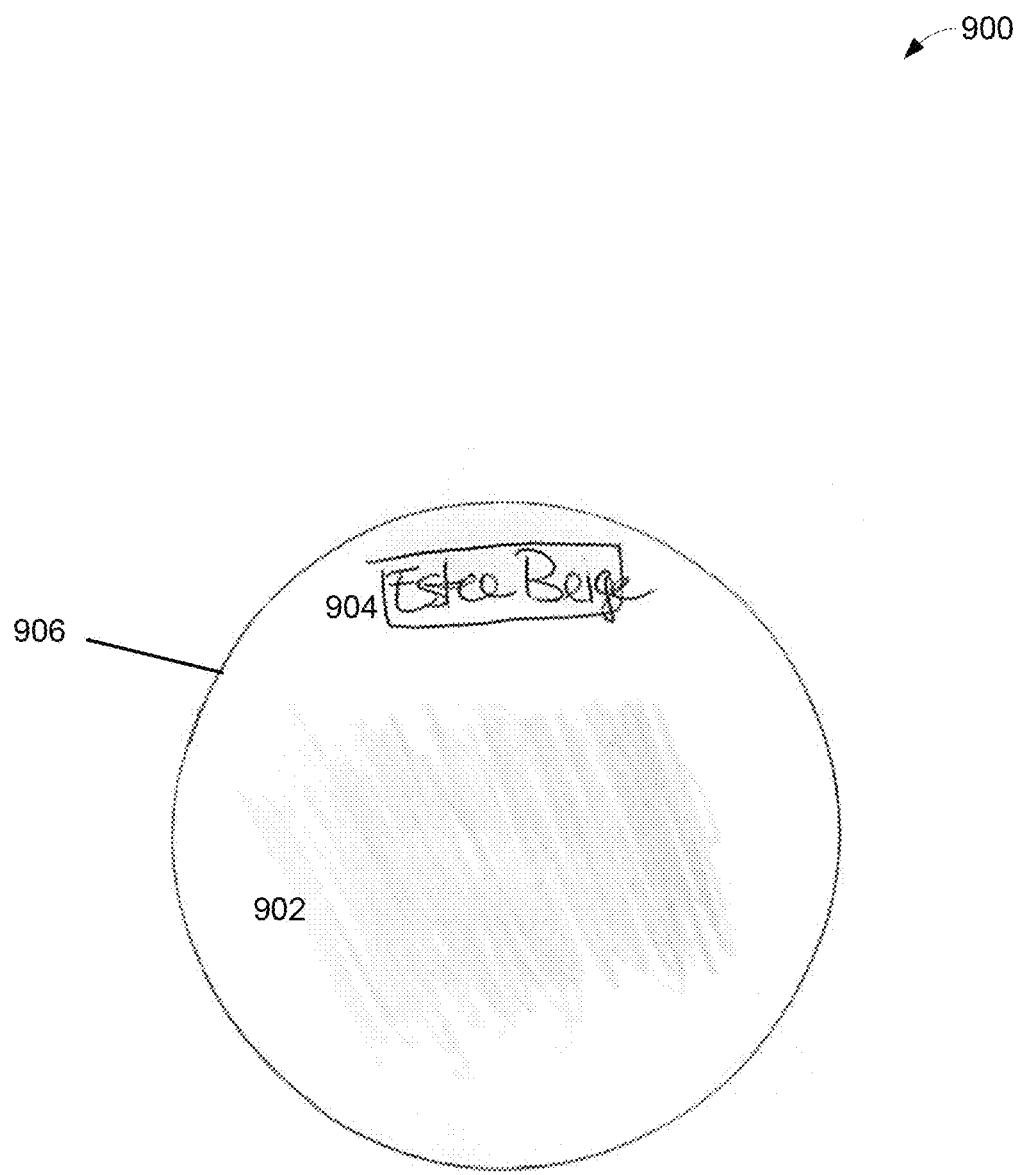
FIG. 9 illustrates a 1-color tester.

FIG. 9 illustrates, generally at 900, one embodiment showing a 1-color tester. The 1-color 902 and marking area 904 are on a substrate 906. The 1-color tester has no special holder, that is, the user can simply use the substrate and/or its perimeter for holding/grasping. The marking area 904 may be directly on the substrate 906 or may be a coated area on the substrate 906. Not shown is any possible watermark on the comparison device.

Figure 10:
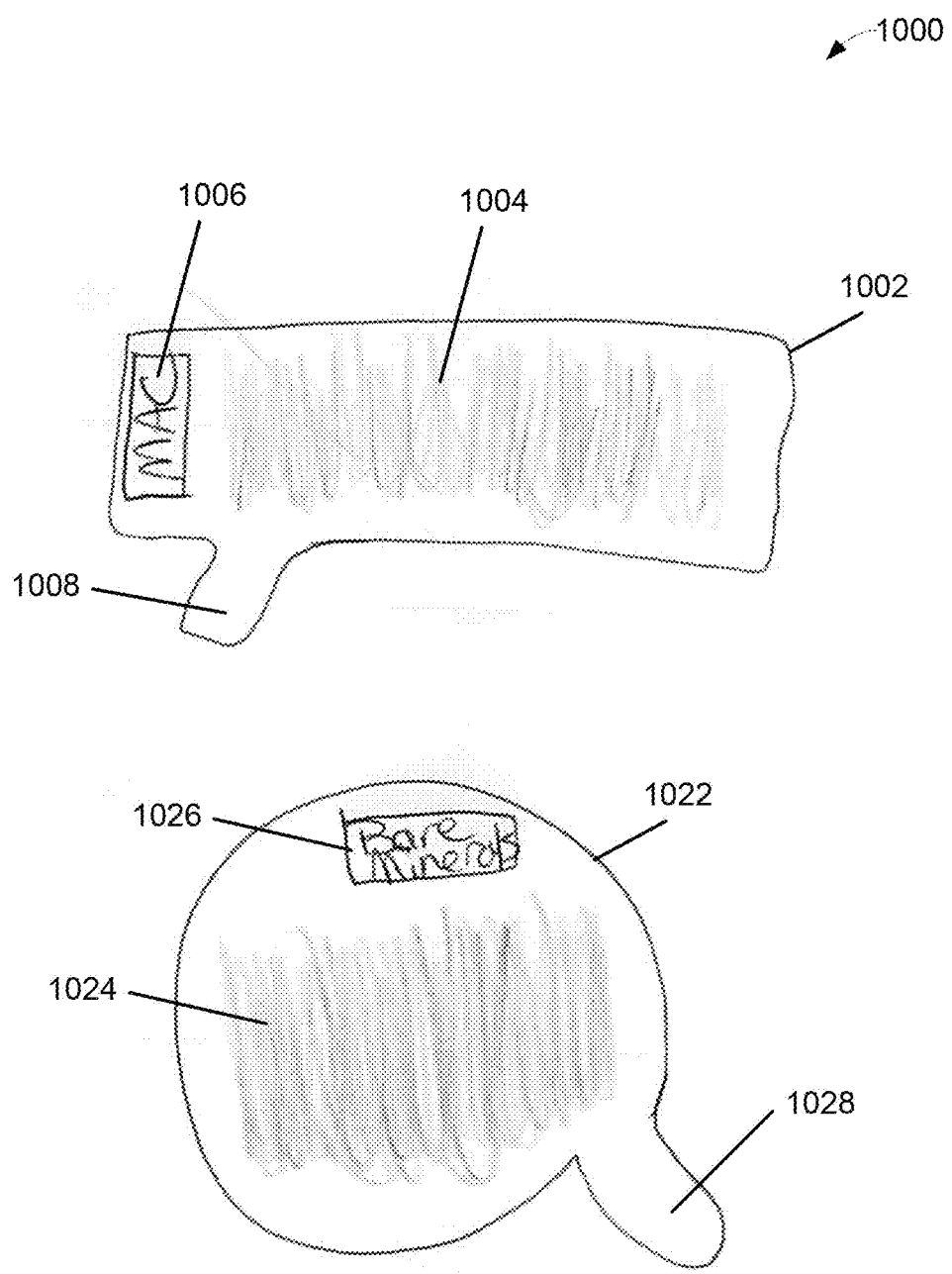
FIG. 10 illustrates 1-color testers with a holder integrated into the color-tester shape.

FIG. 10 illustrates, generally at 1000, embodiments showing 1-color testers with a holder integrated into the color tester shape. At 1002 is a generally rectangular shaped color tester having a color sample at 1004, a marking/indication/identification area at 1006, and an integrated handle at 1008. At 1022 is a generally circular shaped color tester having a color sample at 1024, a marking/indication area at 1026, and an integrated handle at 1028. The marking/indication area may be a coated area, textured area, or frosted area on the color tester (e.g. 1002, 1022). Not shown is any possible watermark on the comparison device.

Figure 11:
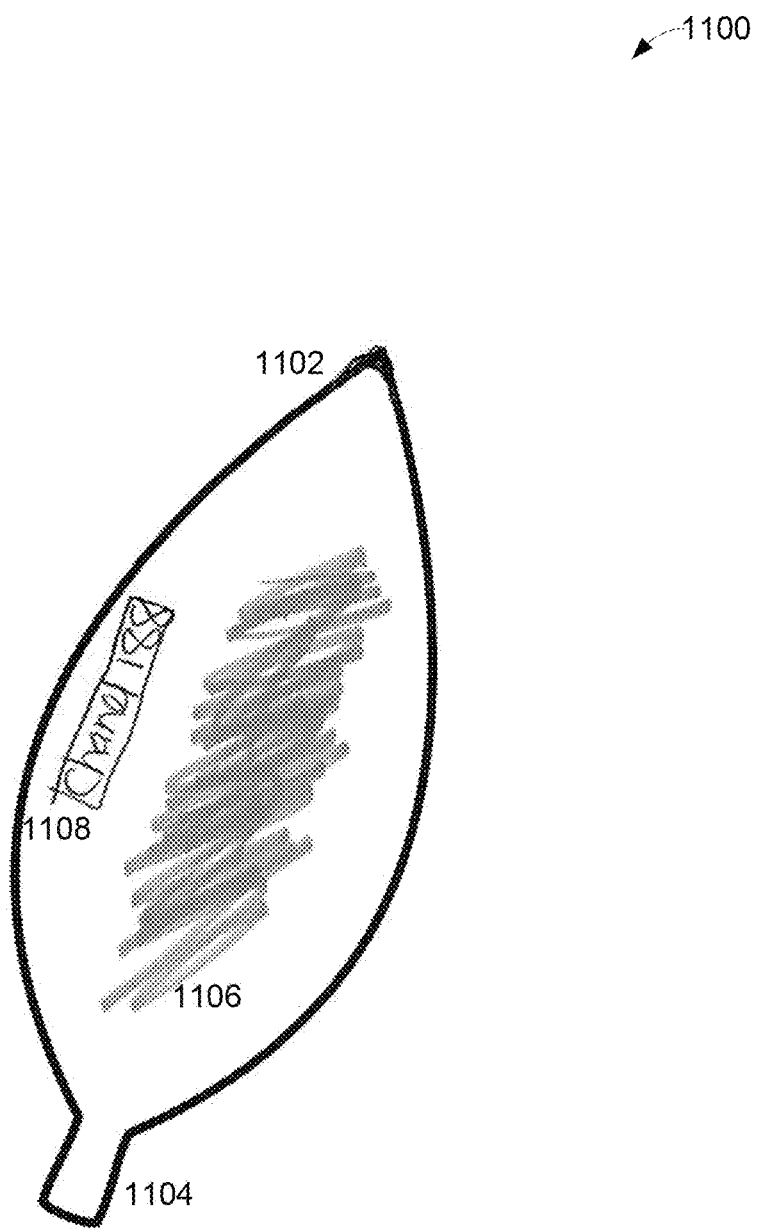
FIG. 11 illustrates a leaf shaped comparison device.

FIG. 11 illustrates, generally at 1100, one embodiment showing a leaf shaped (generally oval shaped) comparison device. At 1102 is the leaf having a stem 1104 serving as a holder for a user. At 1106 is the shade/color, and at 1108 is a marking/indication area. While the leaf in FIG. 11 is a single leaf showing a single color, the embodiment is not so limited and may show more colors/shades, for example, around the perimeter in different sections. Not shown is any possible watermark on the comparison device.

Figure 12:
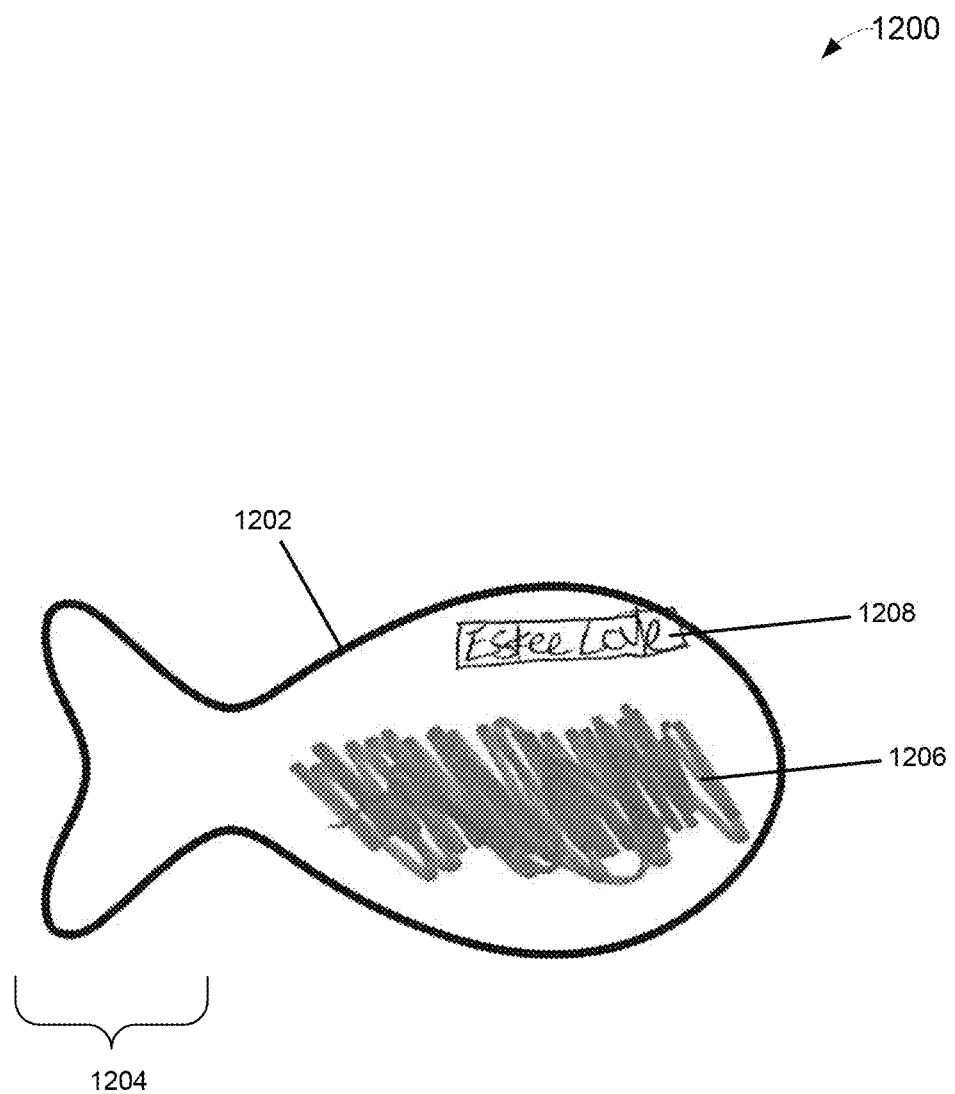
FIG. 12 illustrates a fish shaped comparison device.

FIG. 12 illustrates, generally at 1200, one embodiment showing a fish shaped comparison device. At 1202 is the fish having a tail 1204 serving as a holder for a user. At 1206 is the shade/color, and at 1208 is a marking/indication area. While the fish in FIG. 12 is a single fish showing a single color, the embodiment is not so limited and may show more colors/shades, for example, around the perimeter in different sections. Also, the marking/indication area may or may not include a coating on the comparison device. Not shown is any possible watermark on the comparison device.

Figure 13:
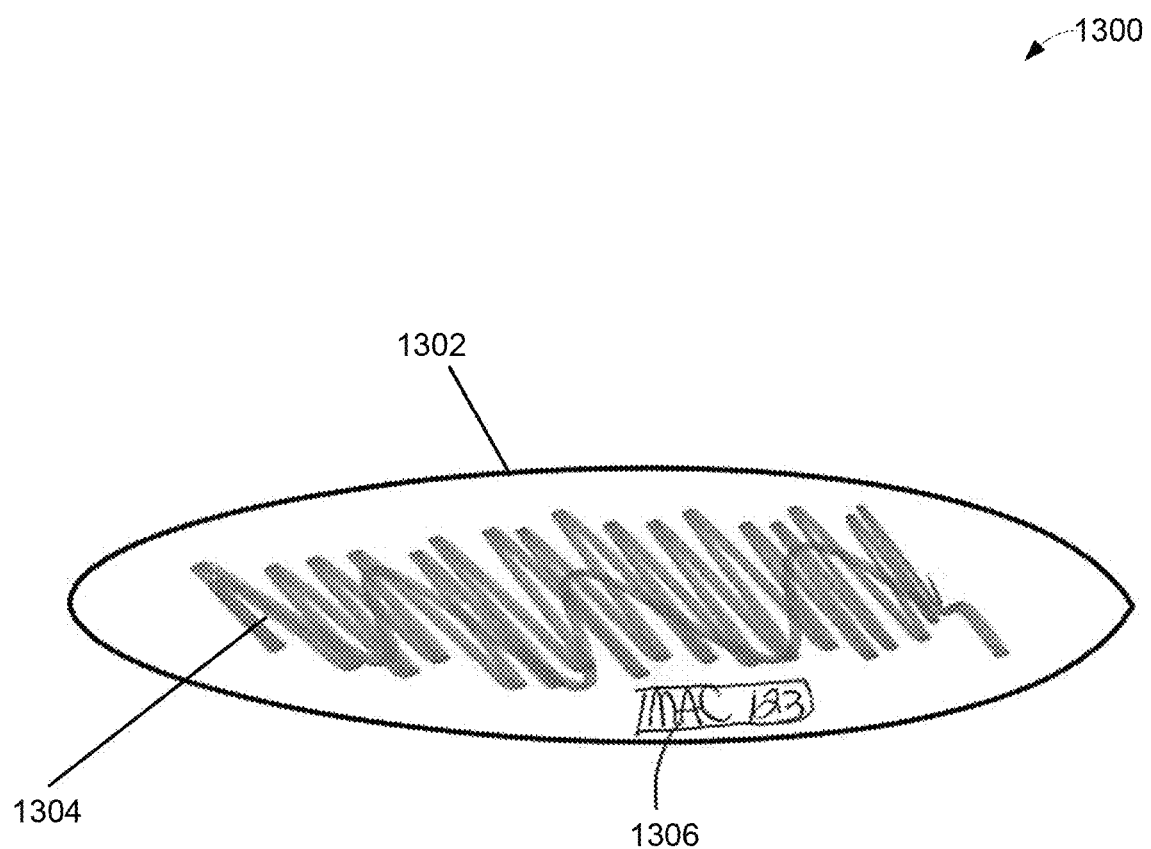
FIG. 13 illustrates a long oval shaped comparison device.

FIG. 13 illustrates, generally at 1300, one embodiment showing a long oval shaped comparison device. At 1302 is the oval which a user could grasp at either end. At 1304 is the shade/color, and at 1306 is an optional marking/indication/identification/writing area. While the oval in FIG. 13 shows a single color, the embodiment is not so limited and may show more colors/shades, for example, a different shade/color may be at each end of the oval. Not shown is any possible watermark on the comparison device.

Figure 14:
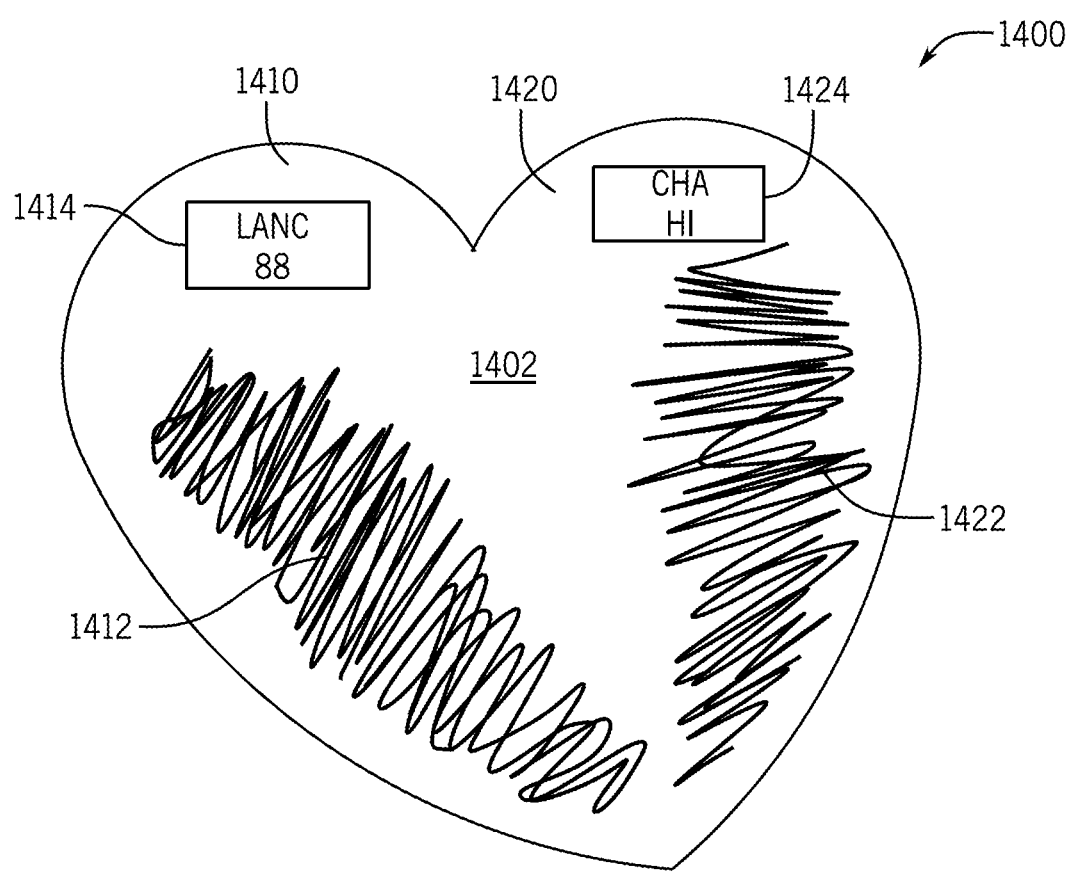
FIG. 14 illustrates a heart shaped comparison device.

FIG. 14 illustrates, generally at 1400, one embodiment showing a heart shaped comparison device. At 1402 is the heart shaped comparison device with the two chambers of the heart 1410, and 1420, each having a shade/color respectively 1412, 1422 and marking/indication area respectively 1414, 1424. While the heart shaped comparison device in FIG. 14 shows two colors, the embodiment is not so limited and may show a single color. Also, the marking/indication area may or may not include a coating on the comparison device. The user may grasp the heart shaped comparison device anywhere including the bottom of the heart as a holder or use an affixed handle (not shown). Not shown is any possible watermark on the comparison device.

Figure 15:
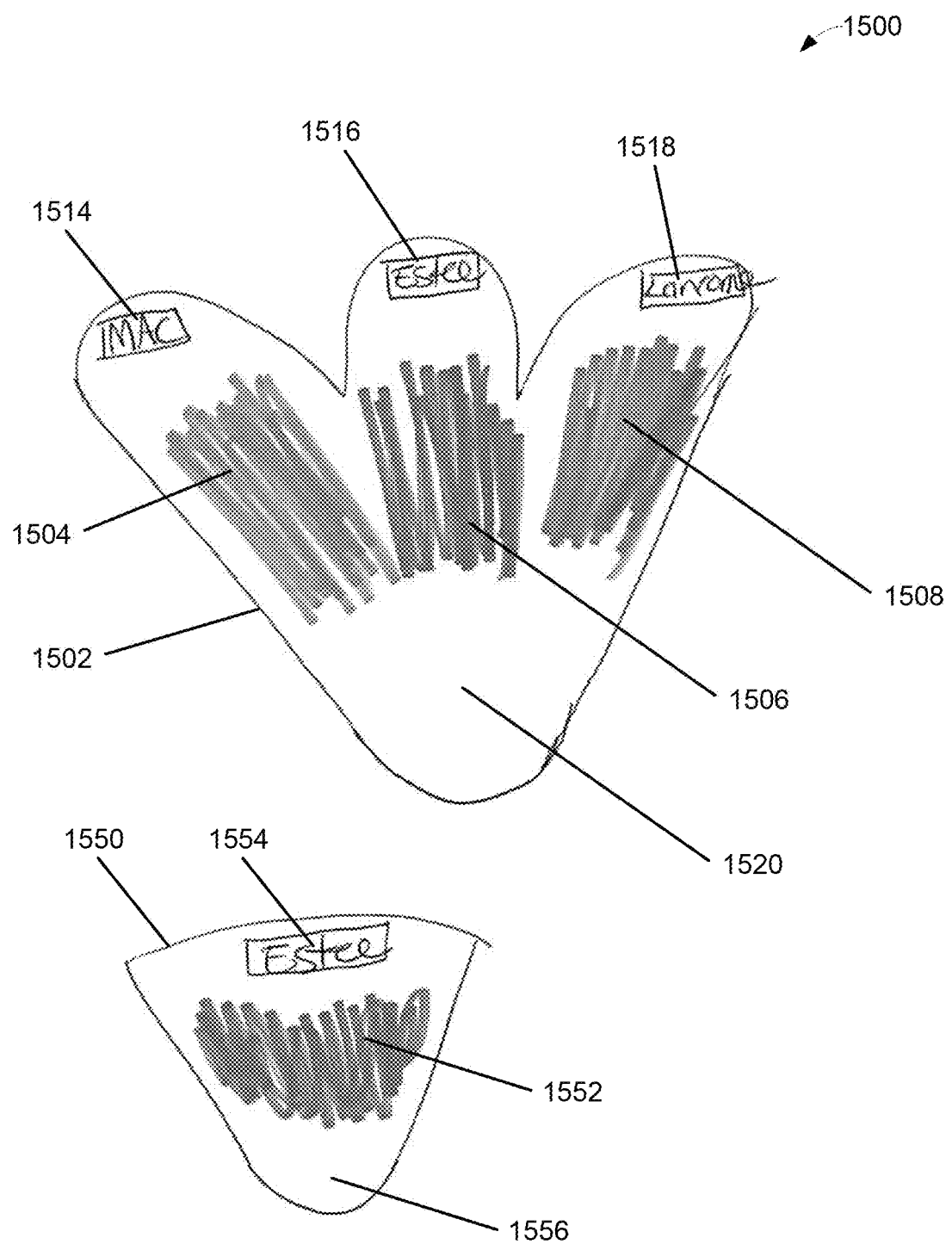
FIG. 15 illustrates various color testers.

FIG. 15 illustrates, generally at 1500, embodiments showing color testers. At 1502 is a 3-slat fan. At 1504, 1506, and 1508 are the various colors. At 1514, 1516, and 1518 are the respective marking/indication/identification areas. At 1520 at the bottom of the fan is a holding area for a user. At 1550 is a single fan color tester having at 1552 a single color, at 1554 a marking/indication/identification area, and at 1556 a holding area for a user at the bottom of the single fan color tester 1550. The marking/indication area may or may not include a coating on the comparison device. Not shown is any possible watermark on the comparison device.

Figure 16:
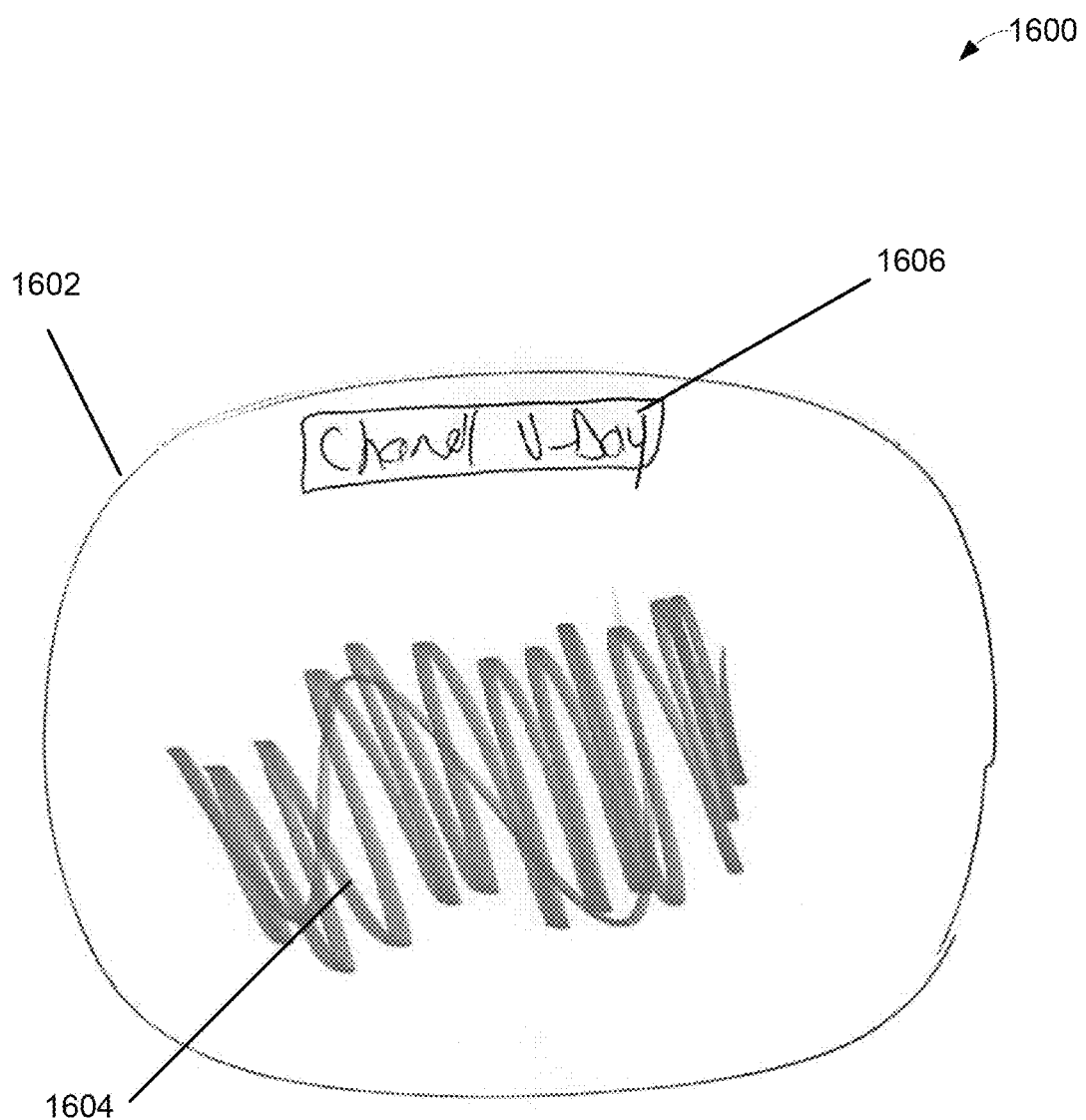
FIG. 16 illustrates a rounded rectangular shaped comparison device.

FIG. 16 illustrates, generally at 1600, one embodiment showing a rounded rectangular shaped comparison device. At 1602 is the comparison device which a user could grasp anywhere. At 1604 is the shade/color, and at 1606 is the marking/indication/identification/writing area. While the comparison device in FIG. 16 shows a single color, the embodiment is not so limited and may show more colors/shades, for example, different shades/colors may be at areas around the periphery. Not shown is any possible watermark on the comparison device.

While the embodiments described above and illustrated have shown a relatively small color tester that can come preprinted or the color sample or makeup can be applied by a user, the invention is not so limited. For example, if the user wanted to test a variety of colors/shades, for example, on an arm, the substantially clear comparison device could wrap around the arm and secure to itself in a form similar to a cylinder. Then the user could apply a variety of colors/shades (for example by using the other hand) and determine if any of the colors/shades were acceptable.

Figure 17:
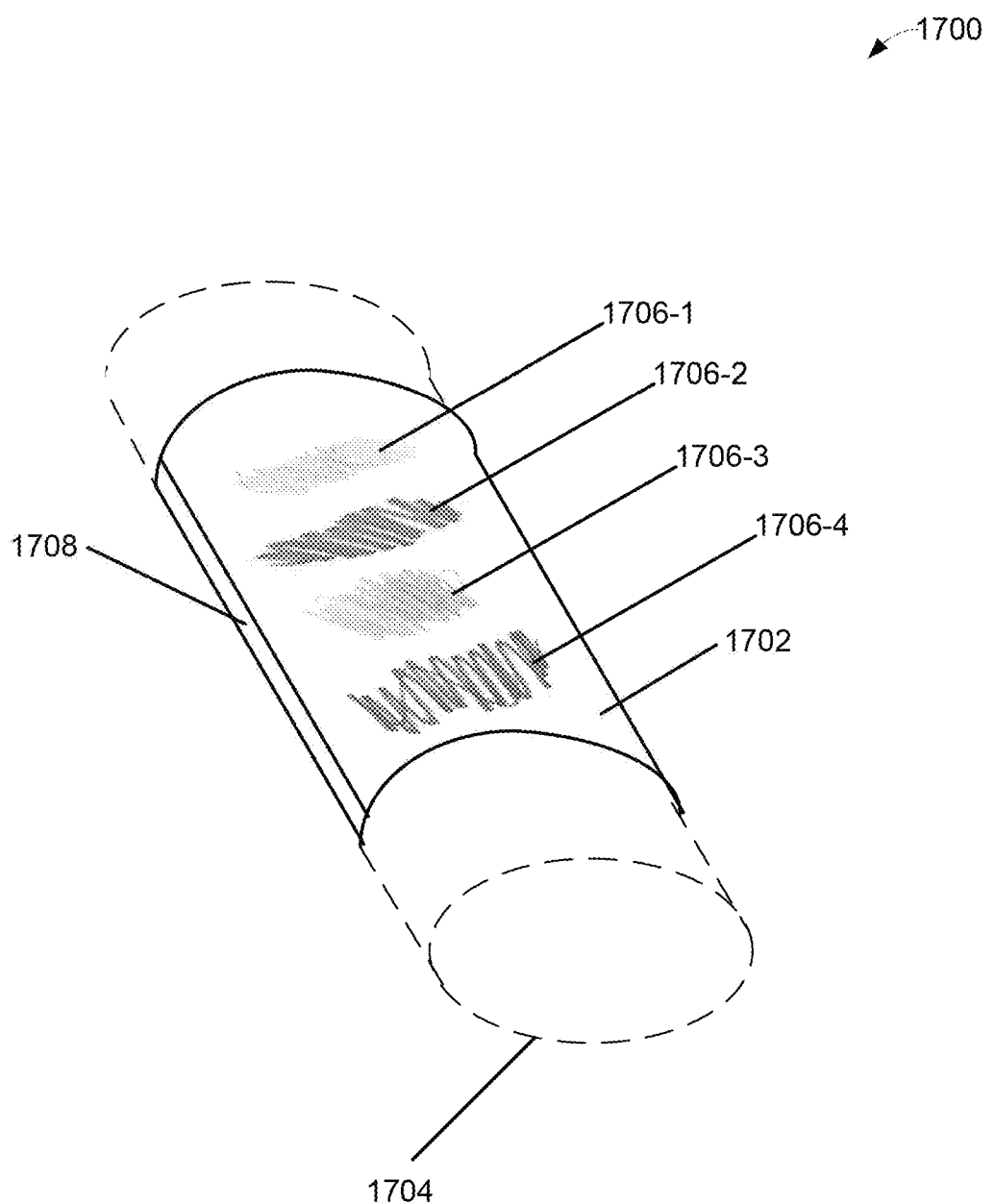
FIG. 17 illustrates a cylindrical shaped comparison device.

FIG. 17, illustrates, generally at 1700, an embodiment showing the comparison device. At 1702 is the color tester also called the comparison device formed into a cylindrical shape. At 1704 in dashed lines are a body part, for example, in this case, an arm. At 1706-1 to 1706-4 are four color samples. At 1708 is where the comparison device attaches to itself. This attachment could be adhesive, a button and hole, Velcro® or any suitable attachment device. The number of color samples (such as at 1706) can vary based on the user or a printer if it is a preprinted comparison device. Not shown is any possible watermark on the comparison device.

Nor is the invention limited to the comparison device being a substantially pliable material. For example, a glass slide could be used to hold the color(s) and be pressed against the user's skin to see the comparison. A glass slide could be sanitized, for example, in a dishwasher and reused. The glass slide can be clear or frosted.

Nor is the invention limited to using a glass slide, that is, a plastic slide that is rigid could be used.

Figure 18:
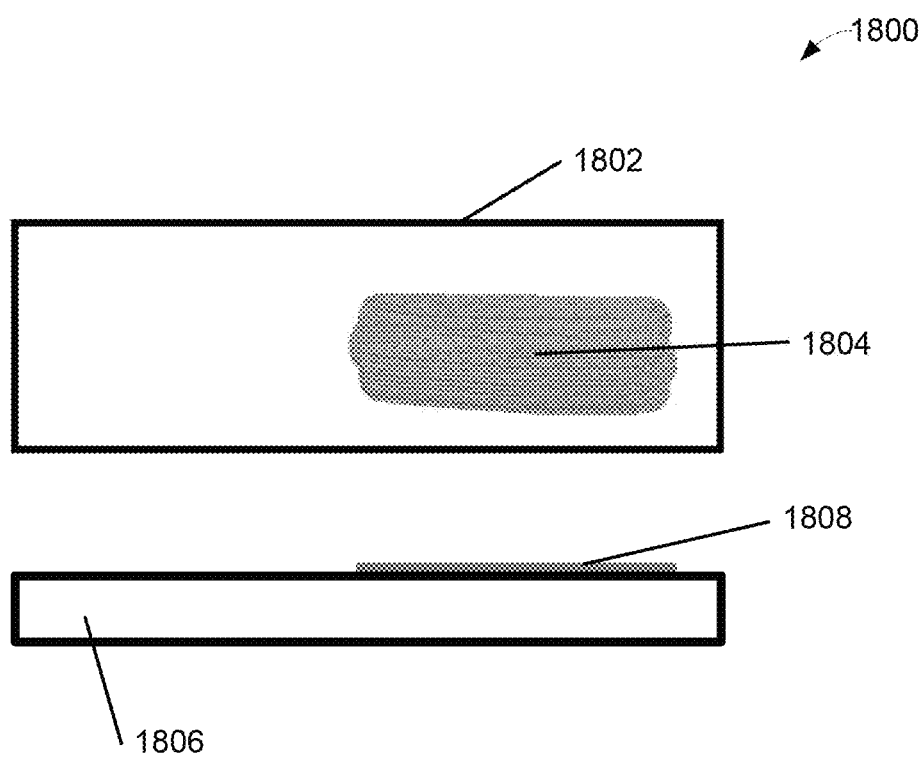
FIG. 18 illustrates a rigid comparison device.

FIG. 18, illustrates, generally at 1800, an embodiment showing the comparison device which is not a pliable material. At 1802 is a top view of a comparison device. At 1804 is a color sample, for example, lipstick. At 1806 is a side view of the comparison device. At 1808 (not to scale) is the side view of the color sample, for example, lipstick. Not shown is any possible watermark on the comparison device.

Figure 19:
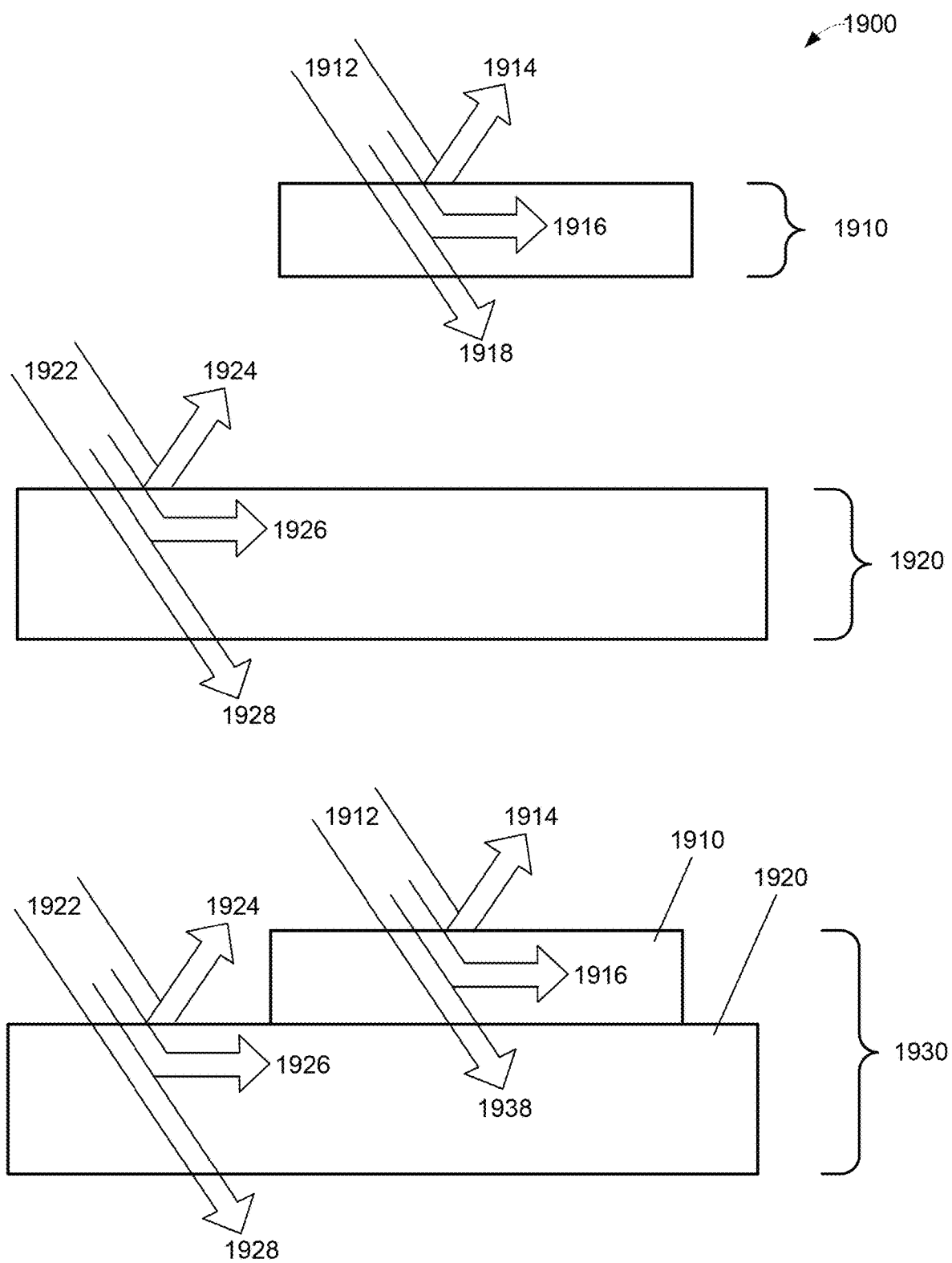
FIG. 19 illustrates various reflectivity, absorptivity, and transmissivity factors.

FIG. 19, illustrates, generally at 1900, an embodiment showing various reflectivity, absorptivity, and transmissivity factors. Not every reflectivity, absorptivity, and transmissivity is shown for each surface. FIG. 19 is not to scale and is a side view. At 1910 is a color sample. At 1912 is incident radiation hitting color sample 1910 (Gc). At 1914 is reflectivity off the color sample 1910 (Gcref). At 1916 is absorptivity of the color sample 1910 (Gcabs). At 1918 is transmissivity of the color sample 1910 (Gctr).

At 1920 is a substrate. At 1922 is incident radiation hitting substrate 1920 (Gs). At 1924 is reflectivity off the substrate 1920 (Gsref). At 1926 is absorptivity of the substrate 1920 (Gsabs). At 1928 is transmissivity of the substrate 1920 (Gstr).

At 1930 is a combined substrate and color sample. Note that the radiation 1938 does not show reflection at the color sample 1910 substrate 1920 interface, nor absorptivity in the substrate 1920.

Figure 20:
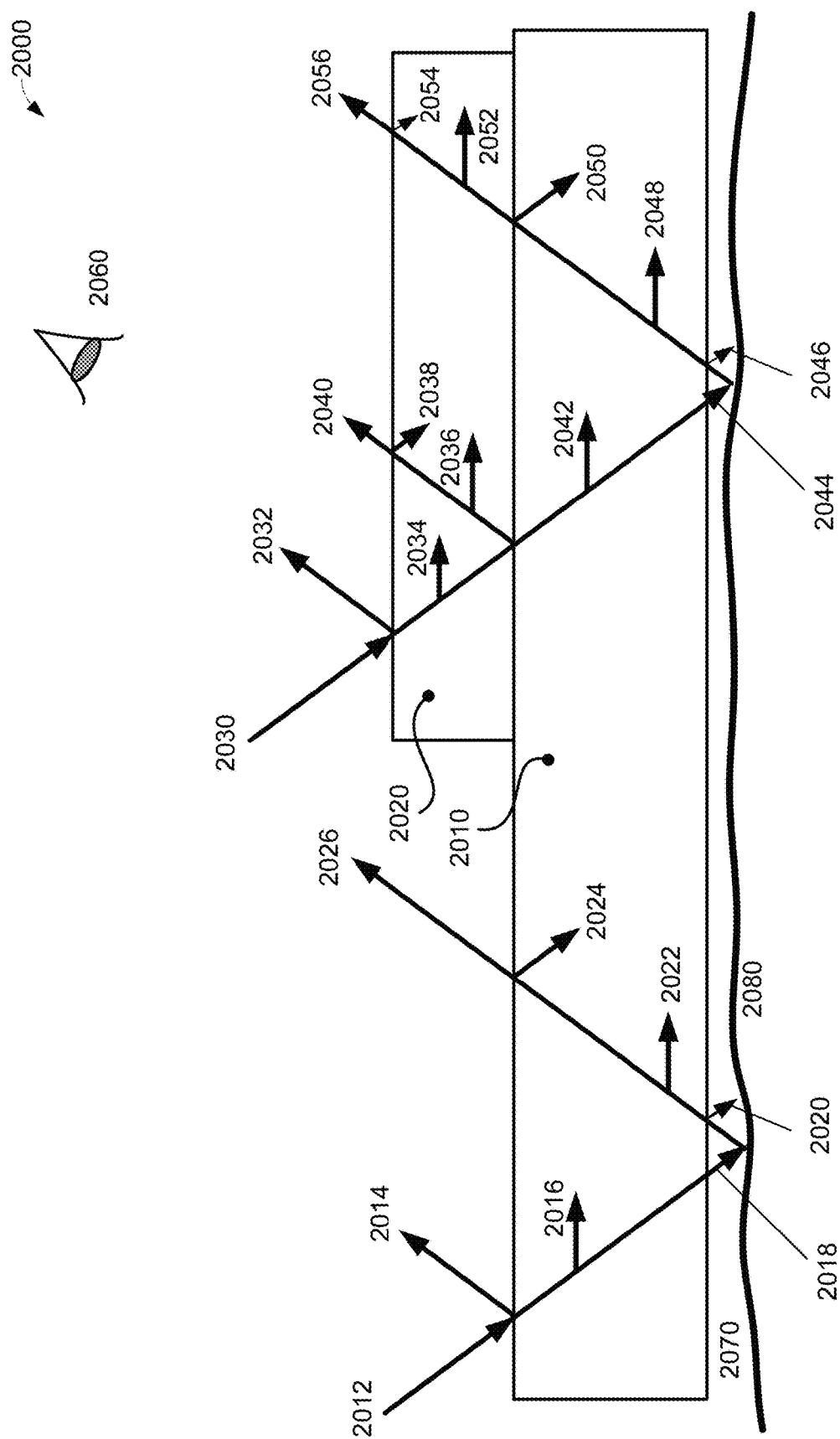
FIG. 20 illustrates various reflectivity, absorptivity, and transmissivity factors.

FIG. 20, illustrates, generally at 2000, an embodiment showing various reflectivity, absorptivity, and transmissivity factors. Not every reflectivity, absorptivity, and transmissivity is shown for each surface. FIG. 20 is not to scale and is a side view. Arrows are used in this illustration to indicate light rays and the arrow shaft thickness does not indicate amplitude, nor does the shaft length indicate amplitude.

At 2010 is a substrate. At 2012 is incoming light which hits the surface of the substrate 2010 and reflects part of the light at 2014. Part of light 2012 is absorbed by the substrate 2010 shown as 2016. The remaining light 2018 is transmitted through the substrate 2010 and in this illustration is reflected off a surface 2080 to which the substrate 2010 is in proximity. The gap 2070 between the substrate 2010 and the surface 2080 is not to scale and the gap 2070 if in intimate contact with surface 2080 would be very small. The remaining light 2018 is reflected off 2080 and is shown emerging at 2026. Before the light emerges at 2026 part of the light is reflected as shown at 2020, part of the light is absorbed in the substrate 2010 as shown at 2022, and part of the light is reflected at 2024.

At 2020 is a color sample sitting on the substrate 2010. At 2030 is incoming light which hits the surface of the color sample 2020 and reflects part of the light at 2032. Part of light 2030 is absorbed by the color sample 2020 shown as 2034. Part of light 2030 is reflected off the boundary between the substrate 2010 and the color sample 2020 and emerges as 2040. Before it emerges at 2040 part of it is absorbed by the color sample 2020 as shown at 2036 and part of it is reflected as shown at 2038.

The remaining light 2030 traverses through the substrate 2010 as shown at 2044 and in this illustration is reflected off the surface 2080 to which the substrate 2010 is in proximity. The remaining light 2044 is reflected off 2080 and is shown emerging at 2056. Before the light emerges at 2056 part of the light is reflected off the substrate 2010 as shown at 2046, part of the light is absorbed in the substrate 2010 as shown at 2048, and part of the light is reflected at the substrate 2010 and color sample 2020 boundary as shown at 2050, the light then enters the color sample 2020 where part of it is absorbed as shown at 2052, part of the light is reflected as shown at 2054 before it emerges as shown at 2056.

At 2060 is a representative position from which a user might view the substrate 2010 with the color sample 2020. What is to be appreciated is that user would see light as shown from 2014, and 2026 from the substrate 2010. And the user would see light as shown from 2032, 2040, and 2056 from the color sample 2020 sitting on top of the substrate 2010.

As shown in FIG. 20, the ability to see the substrate 2010 and the color sample 2020 sitting on the substrate 2010 both of which are sitting on top of a surface 2080 allows the user to see through the substrate 2010, and see the effect of the color sample 2020 also sitting on top of the substrate 2010 and the surface 2080. In this way the user can judge the effect of the color sample 2020 on the surface 2080.

Figure 21:
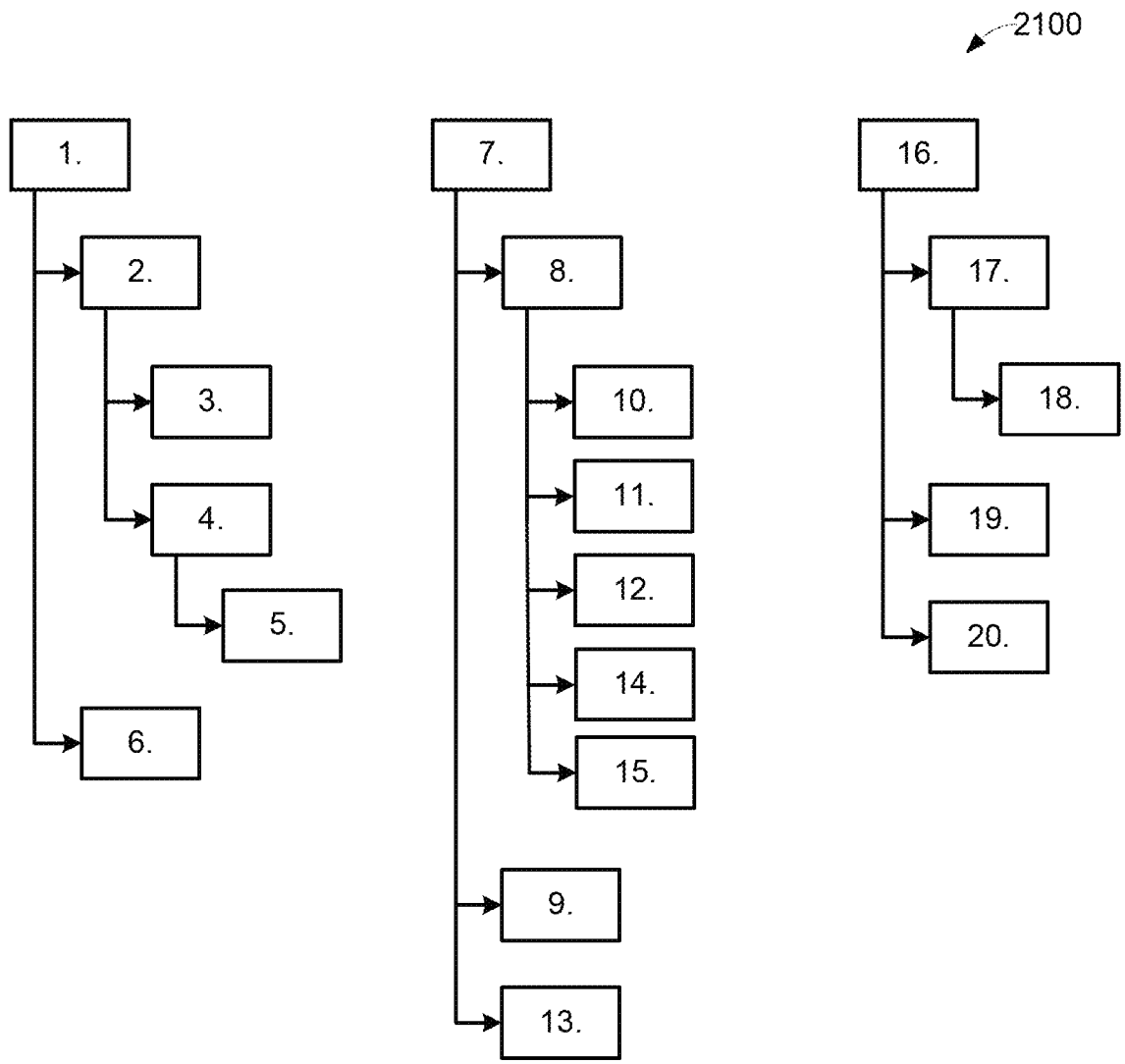
FIG. 21 illustrates various embodiments.

FIG. 21, illustrates, generally at 2100, various embodiments. At 1. A method of making a color comparison device comprising: defining a first region on a substrate, the substrate having a first reflectivity, a first absorptivity, and a first transmissivity; placing on a second region of the substrate a color sample, the color sample having a second reflectivity, a second absorptivity, and a second transmissivity; and wherein the second region of the substrate having the color sample has a third reflectivity, a third absorptivity, and a third transmissivity; wherein the substrate first transmissivity is greater than zero; wherein the third transmissivity is less than the first transmissivity; and wherein the first region on the substrate and the second region of the substrate are not a same region. At 2. The method of 1. wherein the substrate is impervious to the color sample. At 3. The method of 2. wherein the color sample is lipstick. At 4. The method of 2. wherein the substrate is made of a substantially pliable material wherein the substantially pliable material substantially conforms to a body shape of a user when the substantially pliable material is pressed against the body shape of the user. At 5. The method of 4. wherein the substantially pliable material is a gelatinous-like material. At 6. The method of 1. wherein the substrate is a glass slide, and wherein the glass slide is selected from the group consisting of a clear glass slide, and a frosted glass slide. At 7. A method for limiting the spread of pathogens when trying out makeup, the method comprising: providing a sample of the makeup on a second region of a comparison device, the comparison device having a first region, the first region of the comparison device having a first reflectivity and the first region does not contain the sample of the makeup, the second region is covered with the sample of the makeup and has a second reflectivity, wherein the second reflectivity is different than the first reflectivity; and providing the comparison device for placement proximate to a user's body part. At 8. The method of 7. wherein the second region of the comparison device is impervious to the sample of the makeup. At 9. The method of 7. wherein the transparent region of the comparison device allows the user to see the body part without the sample of the makeup. At 10. The method of 8. wherein when the comparison device is placed proximate to the user's body part both the sample of the makeup and the user's body part are visible to the user. At 11. The method of 8. wherein the transparent region is flexible and when pressed against the user's body part substantially conforms to the body part shape. At 12. The method of 8. wherein the transparent region does not allow the makeup to soak through the transparent region, and the transparent region does not react with the makeup, and the transparent region does not allow the makeup to slide off. At 13. The method of 7. further comprising imprinting on the comparison device an identification code for the sample of the makeup. At 14. The method of 8. wherein the transparent region is a gelatinous-like material. At 15. The method of 8. wherein the transparent region does not allow the makeup to soak through the transparent region, and the transparent region does not react with the makeup, and the transparent region does not allow the makeup to slide off. At 16. An apparatus, comprising: one or more color samples applied on a first portion of a substantially transparent pliable substrate; a second portion of the substantially transparent pliable substrate is free of the one or more color samples; one or more identification marking areas to identify the one or more color samples; and wherein at least one of the one or more identification marking areas is located on the substantially transparent pliable substrate. At 17. The apparatus of 16. wherein the substantially transparent pliable substrate is to be placed on an object to show a user how the one or more color samples will appear on the object without getting the one or more color samples on the object. At 18. The apparatus of 17. wherein the object is an inanimate object. At 19. The apparatus of 16. wherein the one or more color samples are one or more color samples selected from the group consisting of makeup, stains, powder coatings, and glazes, and wherein the substantially transparent pliable substrate is hypoallergenic. At 20. The apparatus of 16. wherein the substantially transparent pliable substrate substantially conforms to a body shape of a user when the substantially transparent pliable substrate is pressed against the body shape of the user.

The comparison device may be any suitable shape for comparison. For example, the best shape for fingernail color comparisons may be in the general shape of various fingernails or the best shape for lip color comparisons may be in the general shape of lips, or the best shape for tooth whitening color comparisons may be in the general shape of upper and lower teeth, or the best shape for optical frames or colored contact lenses may be in the general shape of eyes, etc. What is to be appreciated is that the shape of the comparison device may be configured for a better color comparison.

The substrate upon which the colors/shades are placed may be constructed of a film or mesh whether coated or uncoated or laser-cut material, etc., sufficient to hold the color/shade and yet compliant if needed to conform to a feature on a human user, for example, to conform to a cheek area, etc. Additionally, the substrate need not be of uniform thickness. For example, for structural integrity the thickness on an outer perimeter may be of a greater thickness to serve as a frame or holder for the inner thinner (more compliant) parts of the color tester. The substrate may be of one or more materials, such as, but not limited to, a gelatinous-like material with the outer edges acting as a frame, and the internal area may be clear, transparent, translucent, or opaque (of any color).

In one embodiment a clear/transparent/translucent/coated-mesh/uncoated-mesh substrate (if to be placed against skin/hair/body: could be food-grade, pharmaceutical-grade, BPA/BPS-free, etc. so safer/healthier) that is any suitable, flexible or pliable material. It may be resistant to products applied (e.g. impervious or not soaking through or reacting with the product applied or sliding off). The substrate material in one embodiment when stacked would not adhere/stick to other pieces. In one embodiment the substrate material may adhere to other substrates (e.g. to see combined effect). In one embodiment the substrate is printable for identification either on the substrate itself or on an attachment used for writing and/or holding, etc.

In one embodiment the substrate is thin (~0.4 mm or thinner depending on material if for cosmetics/personal care items) and could be thicker if needed for inanimate objects.

In one embodiment the substrate is a gelatinous-like material.

In one embodiment the substrate is held in place by a frame made of the same or different material from the substrate.

In one embodiment the substrate is semi-rigid to rigid (depending on material)—rigid enough to remain flat (i.e. not flop around) when held against the face/body but not too rigid that can't partially mold or fit to face/body if/as needed if for cosmetics/personal care/certain healthcare items like tooth whitener and could be more rigid if for inanimate objects In one embodiment rounded edges (no sharp points) may be used so it won't injure parts of the body, especially for delicate skin areas such as, but not limited to, the face, eyes, lips, inside the mouth, fingers, hands, etc.

In one embodiment the substrate may have a removable adhesive. This would possibly aid in attachment to an item to be colorized so as to view the color.

In one embodiment the substrate may be made of a cling-type film. For example, wrapping an item to be colorized so that the color can be seen on the item.

In various embodiments the shape may be oval, scallop, fan, or square/rectangle with rounded edges, etc. Some embodiments may be body-part shaped such as fingernails for nail polish, lips/mouth for lipstick, upper and/or lower teeth for teeth whitening, eyes for optical frames or colored contact lenses, etc. if for cosmetics/personal care/certain healthcare items while for inanimate objects, more traditional square/rectangle/circle shapes may be appropriate A holder or handle for the shape may be provided on the bottom or any chosen side or sides to help position the substrate when held (whether the handle/holder being an integrated design from the substrate or separately affixed to the substrate by any material or by any method of adherence, or clamping, etc.)

In one embodiment a watermark or marking which does not interfere with color testing and viewing may be applied. These can include a brand name, logo, etc.

In one embodiment a section (e.g. small section) contains a white/light-colored coating enabling users to identify colors being tested via writing on the section the product name, brand, and color name/number (or any desired words) among many choices so the user can easily shortlist product candidates and easily recall what should be further narrowed or eventually tested directly on the object (e.g. skin, wall, furniture, etc.).

In one embodiment the size offered can include space for 4, 6, 8, or more colors with written notations (e.g. numbers, letters, etc.) to easily move across the object (e.g. body part, wall, furniture, etc.) to be colored, thereby making it easier/faster/economical to compare as well as minimize the number of 1-color or multi-color testers used.

In one embodiment the substrate can be invisibly patterned/dimpled/textured/laser cut to provide better adherence or affect reflectivity.

In one embodiment the substrate can have absorbent material and/or a coating, such as an adhesive, to receive and hold the coloring (e.g. powder) without sliding off and/or dispersing.

In one embodiment pre-colored versions for non-sampling environments will have actual color either sandwiched between two+layers or permanently adhered via technical process, such as, but not limited to, UV curing, etc.

The embodiments can be available in bulk (B2B) and retail (B2C) packaging and retail point-of-sale displays for either B2C or B2B use.

The embodiments may or may not be recyclable and/or made from recycled products or made from organic materials.

Other embodiments are also possible, for example, affixing multiple peelable color films to cardboard/paper so one can print information on the card and remove individual sheets for direct placement on items to be colored as intended.

Other embodiments are also possible, for example, replacing paint chips with single and multiple colors (e.g. tall cards, tri-folds) and cosmetic palettes, etc. This embodiment may be less expensive to produce compared to a writeable coating.

Other embodiments are also possible, such as, but not limited to, a peelable stack much like Post-It® notes.

Embodiments can be used for other purposes, for example, but not limited to, testing custom mixed colors for makeup, food coloring, etc. and seeing how it looks on a particular person, item, icing/baked goods, etc.

Embodiments can also be used in combinations because they are not mutually exclusive, for example, but not limited to individual sheets (comparison devices) can be joined/bound in any number of methods, that is they don't have to remain as single sheets.

Thus a Method and Apparatus for Comparing Colors has been described.

Because of the thermal embodiments the present invention requires specialized hardware, for example, but not limited to, separate channels for thermal conductivity.

As used in this description, "one embodiment" or "an embodiment" or similar phrases means that the feature(s) being described are included in at least one embodiment of the invention. References to "one embodiment" in this description do not necessarily refer to the same embodiment; however, neither are such embodiments mutually exclusive. Nor does "one embodiment" imply that there is but a single embodiment of the invention. For example, a feature, structure, act, etc. described in "one embodiment" may also be included in other embodiments. Thus, the invention may include a variety of combinations and/or integrations of the embodiments described herein.

As used in this description, "substantially" or "substantially equal" or similar phrases are used to indicate that the items are very close or similar. Since two physical entities can never be exactly equal, a phrase such as "substantially equal" is used to indicate that they are for all practical purposes equal.

It is to be understood that in any one or more embodiments of the invention where alternative approaches or techniques are discussed that any and all such combinations as may be possible are hereby disclosed. For example, if there are five techniques discussed that are all possible, then denoting each technique as follows: A, B, C, D, E, each technique may be either present or not present with every other technique, thus yielding 2^5 or 32 combinations, in binary order ranging from not A and not B and not C and not D and not E to A and B and C and D and E. Applicant(s) hereby claims all such possible combinations. Applicant(s) hereby submit that the foregoing combinations comply with applicable EP (European Patent) standards. No preference is given any combination.

Thus Method and Apparatus for Comparing Colors have been described.

What is claimed is:

1. A method for limiting the spread of pathogens when a user is trying out user applied makeup, the method comprising:
providing the user with a comparison device having a substate imprevious to pathogens and free of any pre-defined color samples;
the user providing a sample of the makeup on a second region of the comparison device, the comparison device having a first region, the first region of the comparison device having a first reflectivity and the first region does not contain the sample of the makeup, the second region is where the user applied the sample of the makeup and has a second reflectivity, wherein the second reflectivity is different than the first reflectivity; and providing the comparison device for placement proximate to a user's body part.

* * * * *

UNITED STATES PATENT AND TRADEMARK OFFICE
CERTIFICATE OF CORRECTION

PATENT NO. : 11,887,509 B2
APPLICATION NO. : 17/224968
DATED : January 30, 2024
INVENTOR(S) : Lee Kaplan It is certified that error appears in the above-identified patent and that said Letters Patent is hereby corrected as shown below:

In the Claims

Claim 1, Line 40:
Change "imprevious" to --impervious--

Signed and Sealed this
Sixteenth Day of April, 2024

*Katherine Kelly Vidal*

Katherine Kelly Vidal
*Director of the United States Patent and Trademark Office*